United States Patent
Conrad et al.

(10) Patent No.: US 7,908,497 B2
(45) Date of Patent: *Mar. 15, 2011

(54) COMMUNICATION BUS POWER STATE MANAGEMENT

(75) Inventors: Shaun Conrad, Hillsboro, OR (US); Robert Safranck, Portland, OR (US); Selim Bilgin, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/378,210

(22) Filed: Feb. 12, 2009

(65) Prior Publication Data

US 2009/0157933 A1 Jun. 18, 2009

Related U.S. Application Data

(63) Continuation of application No. 11/446,661, filed on Jun. 5, 2006, now Pat. No. 7,529,953.

(51) Int. Cl.
*G06F 1/26* (2006.01)
(52) U.S. Cl. .......... 713/300; 713/1; 713/2; 713/310; 713/320; 713/321; 713/322; 713/323; 713/324; 713/330; 713/340
(58) Field of Classification Search .......... 713/1, 2, 713/300, 310, 320–324, 330, 340
See application file for complete search history.

(56) References Cited

U.S. PATENT DOCUMENTS

| | | | |
|---|---|---|---|
| 5,678,018 A | 10/1997 | Chin et al. | |
| 6,009,488 A | 12/1999 | Kavipurapu | |
| 6,192,397 B1 | 2/2001 | Thompson | |
| 6,769,035 B1 | 7/2004 | Garreau | |
| 6,907,492 B2 | 6/2005 | Matsuda et al. | |
| 6,970,905 B2 | 11/2005 | Jeffery et al. | |
| 7,152,125 B2 | 12/2006 | Garney et al. | |
| 7,460,930 B1 | 12/2008 | Howell et al. | |
| 7,529,953 B1 * | 5/2009 | Conrad et al. ............ | 713/300 |
| 2002/0188668 A1 | 12/2002 | Jeffery et al. | |
| 2005/0063313 A1 | 3/2005 | Nanavati et al. | |
| 2006/0137377 A1 | 6/2006 | Samson et al. | |

OTHER PUBLICATIONS

Safranek, Robert J., et al., "Apparatus and Method for Reduced Power Consumption Communications Over a Physical Interconnect", Intel Ref: P23305; U.S. Appl. No. 11/387,407, filed Mar. 22, 2006, 51 pgs.

Safranek, Robert J., et al., "Active Address Table", Intel Ref: P11011; U.S. Appl. No. 11/240,977, filed Sep. 30, 2005, 31 pgs.

Conrad, Shaun et al., "Disclosure Title: Entry Policy into Low Power CSI Link States", Intel Ref: P23212; Disclosure Ref: 47624, 5 pgs.

* cited by examiner

*Primary Examiner* — Abdelmoniem Elamin
(74) *Attorney, Agent, or Firm* — Caven & Aghevli LLC (57) ABSTRACT

Methods and apparatus to manage communication bus power states are described. In one embodiment, an apparatus comprises a bus including a master node and at least a first slave node, logic to transmit a first power state change request from the master node to the first slave node, logic to receive the first power state change request in the first slave node, and logic to designate the first slave node as the master node when the first slave node denies the first power state change request.

21 Claims, 6 Drawing Sheets

COMMUNICATION BUS POWER STATE MANAGEMENT

RELATED APPLICATIONS

This application is a continuation of U.S. patent application Ser. No. 11/446,661 to Conrad, et al., entitled COMMUNICATION BUS POWER STATE MANAGEMENT, filed on Jun. 5, 2006, now U.S. Pat. No. 7,529,953, the entire disclosure of which is incorporated herein by reference.

BACKGROUND

The present disclosure generally relates to the field of electronics. More particularly, an embodiment of the invention relates to communication bus power state management.

Power consumption by electronic devices remains an important issue, particularly in mobile and battery operated devices. To reduce power consumption, the operating state of components of electronic devices may be altered to low power consumption states during periods of inactivity.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention.

Some of the embodiments discussed herein may provide techniques for managing power states of a communication bus in an electronic device. Such techniques may enable a communication bus that provides communication on or between one or more integrated circuit devices to change its power consumption state from a first (e.g., relatively higher) power consumption state to a second (e.g., relatively lower) power consumption state, thereby permitting the electronic device to consume a different amount of power.

Figure 1:
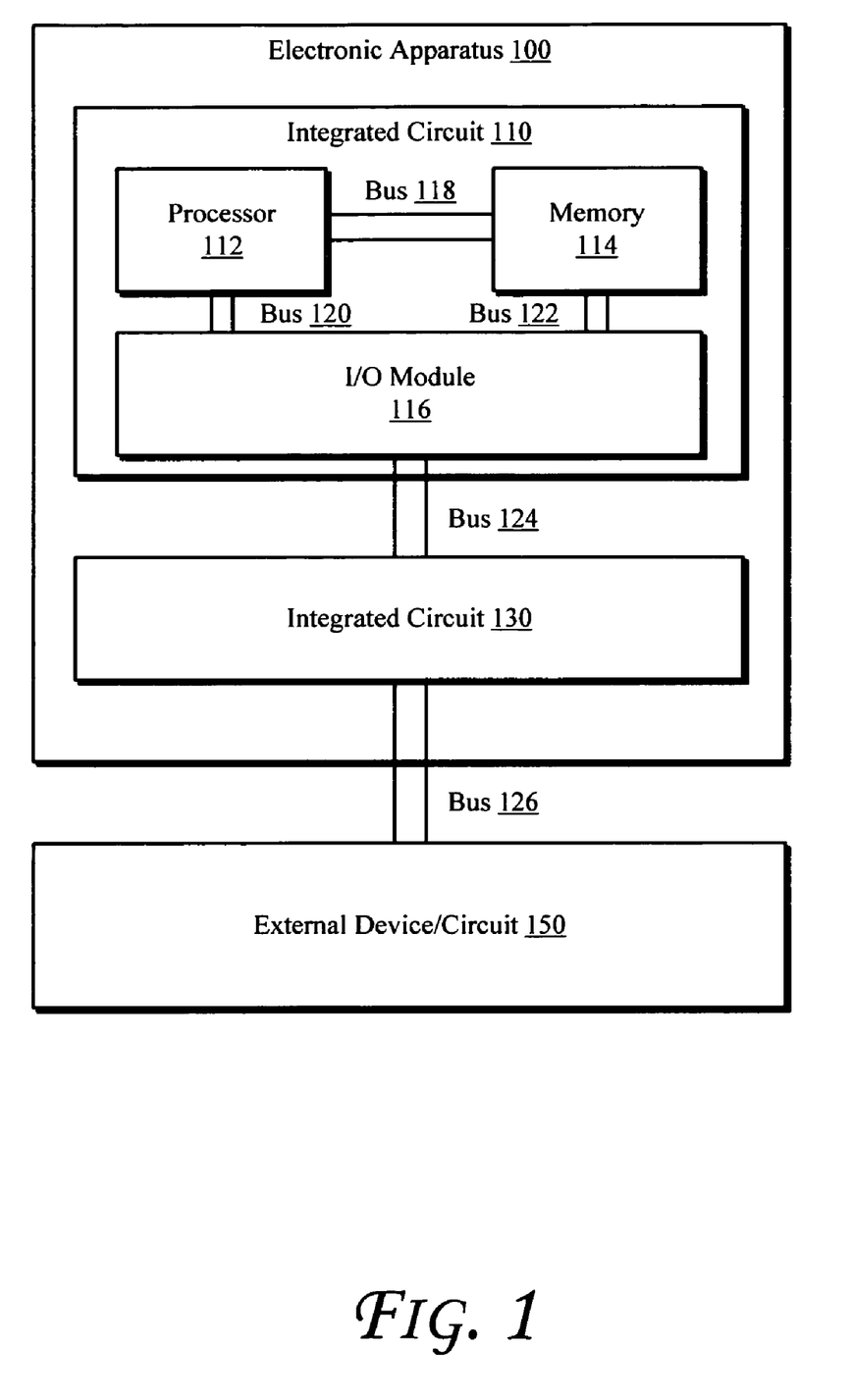
FIG. 1 is a schematic illustration of an electronic system, according to an embodiment.

FIG. 1 is a schematic illustration of an electronic apparatus 100, according to an embodiment. Referring to FIG. 1, electronic system 100 may comprise one or more integrated circuits 110, 130. Integrated circuit 110 may comprise a processor 112, an on-chip memory module 114, and an input-output (I/O) module 116. The processors 112 may be any processor such as a general purpose processor, a network processor that processes data communicated over a computer network, or other types of a processor including a reduced instruction set computer (RISC) processor or a complex instruction set computer (CISC). The memory module 114 may be any memory such as, e.g., Random Access Memory (RAM), Dynamic Random Access Memory (DRAM), Random Operational Memory (ROM), or combinations thereof. I/O module 116 may manage communication between integrated circuit 110 and other devices, such as integrated circuit 120. Integrated circuit 130 may be an input/output (I/O) device such as, e.g., a network adapter, that manages communication with other electronic devices.

In one embodiment, components of integrated circuit 110 may communicate with or more interconnect busses 118, 120, 122. Similarly, integrated circuit 110 may communicate with integrated circuit 130 via interconnect bus 124, and integrated circuit 130 may communicate with an external device or circuit 150 via interconnect bus 126. One or more of interconnect busses 118, 120, 122, 124, 126 may be implemented as point-to-point communication links.

In one embodiment, communication bus power states may be managed by designating one node on the communication bus as the master node, while the remaining node(s) on the communication bus are designated as slave nodes. Requests to change power states from a relatively high power consumption state to a relatively low power consumption state may be initiated by the designated master node and passed to a slave node via a link on the communication bus. When a slave node receives a power state change request, the slave node can either accept the request or decline the request. In the event that the slave node declines the request, the slave node may be designated as the new master node on the link, and the master node may be designated a slave node.

Figure 2:
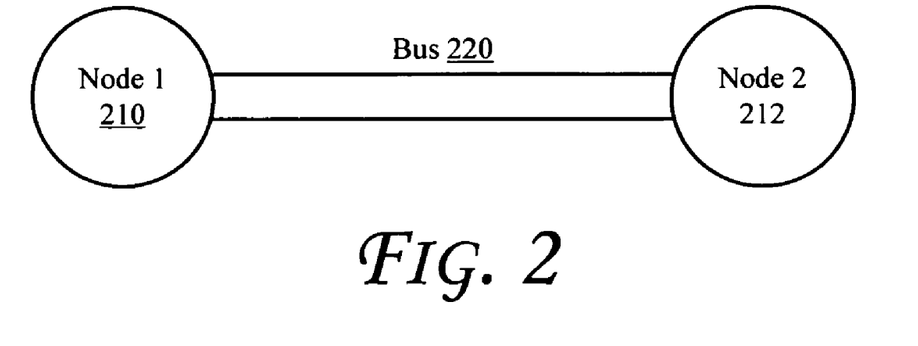
FIG. 2 is a schematic illustration of a two-node communication bus, according to an embodiment.

Power management techniques for a two-node communication bus are explained with reference to FIG. 2 and FIG. 3. FIG. 2 is a schematic illustration of a two-node communication bus, according to an embodiment. Referring first to FIG. 2, in one embodiment a two-node communication bus comprises a first node 210 coupled to a second node 212 by a communication bus 220. In one embodiment, nodes 210, 212 may represent I/O ports in an integrated circuit, or in a module thereof. For example, nodes 210, 212 may represent I/O ports on processor 112, memory 114, or I/O module 116 of integrated circuit 110 (FIG. 1).

Figure 3:
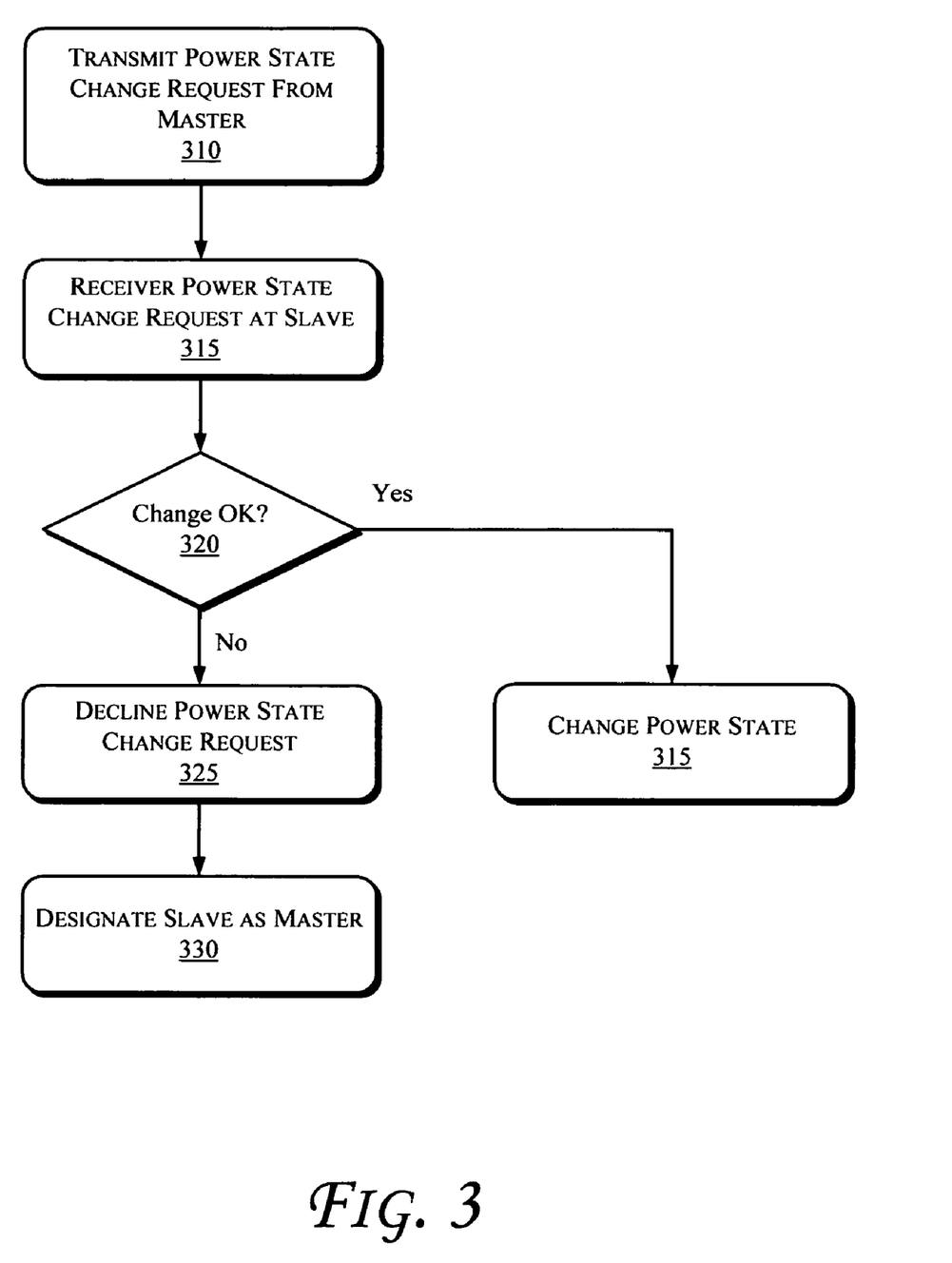
FIG. 3 illustrates a flow diagram of a method to manage communication bus power states in a two-node communication bus, according to an embodiment.

FIG. 3 is a flow diagram of a method to manage communication bus power states in a two-node communication bus, according to an embodiment. The operations illustrated in FIG. 3 may be implemented as logic instructions recorded in a machine-readable memory, e.g., as software executable on a processor such as processor 112 or as firmware executable by a controller such as, e.g., an I/O port controller or a bus controller. Alternatively, the operations of FIG. 3 may be reduced to logic in a configurable logic device such as, e.g., a Field Programmable Gate Array (FPGA), or hard-wired in a logic device such as, e.g., an application specific integrated circuit (ASIC) or as a component of an I/O controller on an integrated circuit.

At operation 310 a power state change request is transmitted from a master node. In one embodiment, the initial designation of a node as the master node may be made arbitrarily. For purposes of explanation, it will be assumed that node 1 (210) is designated as the master node, and node 2 (212) is the slave node by default. At operation 315 the power state change request is received in the slave node 212.

If, at operation 320 the slave node 212 approves the power state change request, then control passes to operation 315 and the power state of the communication bus (or busses) is changed, e.g., from a high power consumption state to a low power consumption state. In some embodiments, slave node 212 may approve a power state change request based one or more conditions. For example, a slave node may ensure that no further I/O operations are pending at the slave node 212. If the slave node 212 approves the power state change request, then the slave node 212 transmits an acknowledgment response to the master node 210. The master node 210 remains the master node status.

By contrast, if at operation 320 conditions at the slave node 212 do not enable the slave node 212 to approve the power state change request, then control passes to operation 325 and the slave node 212 declines the power state change request. In one embodiment, the slave node 212 transmits an acknowledgment response to the master node 210 declining the power state change request. Control then passes to operation 330 and the previous slave node 212 assumes the role of the master node, and the previous master node 210 assumes the role of the slave node.

Figure 4:
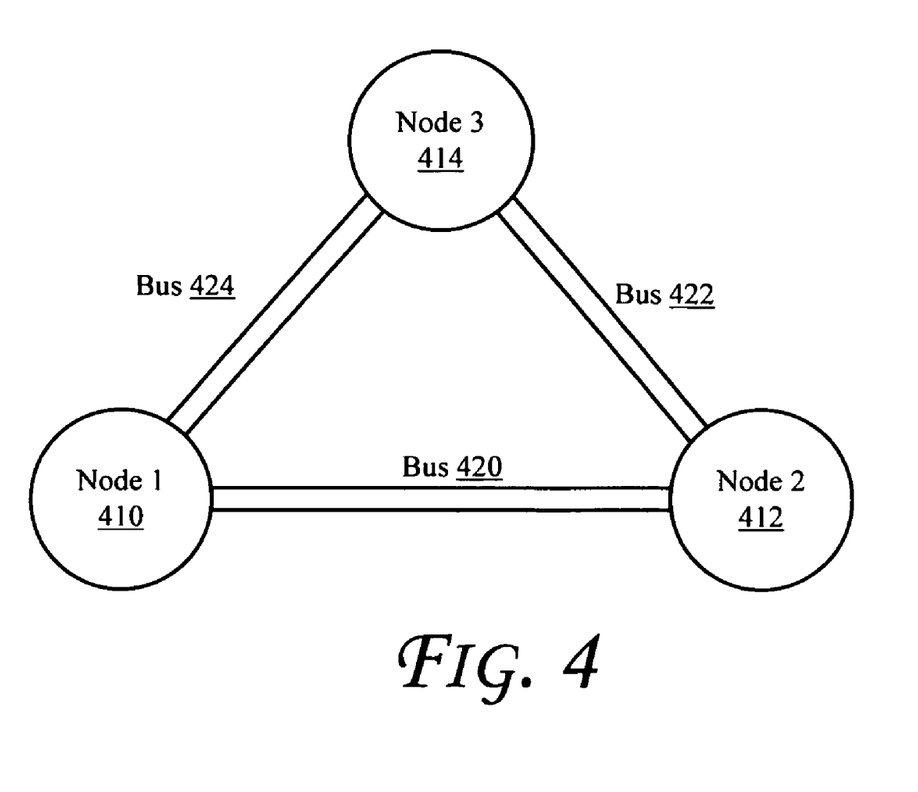
FIG. 4 is a schematic illustration of a three-node communication bus, according to an embodiment.

Power management techniques for a three-node communication bus are explained with reference to FIG. 4 and FIG. 5. FIG. 4 is a schematic illustration of a three-node communication bus, according to an embodiment. Referring to FIG. 4, in one embodiment a three-node communication bus comprises a first node 410, a second node 412, and a third node 414. Nodes 410, 412, 414 are coupled by busses 420, 422, 424. In one embodiment, nodes 410, 412, 414 may represent I/O ports in an integrated circuit, or in a module thereof. For example, nodes 410, 412, 414 may represent I/O ports on processor 112, memory 114, or I/O module 116 of integrated circuit 110.

Figure 5:
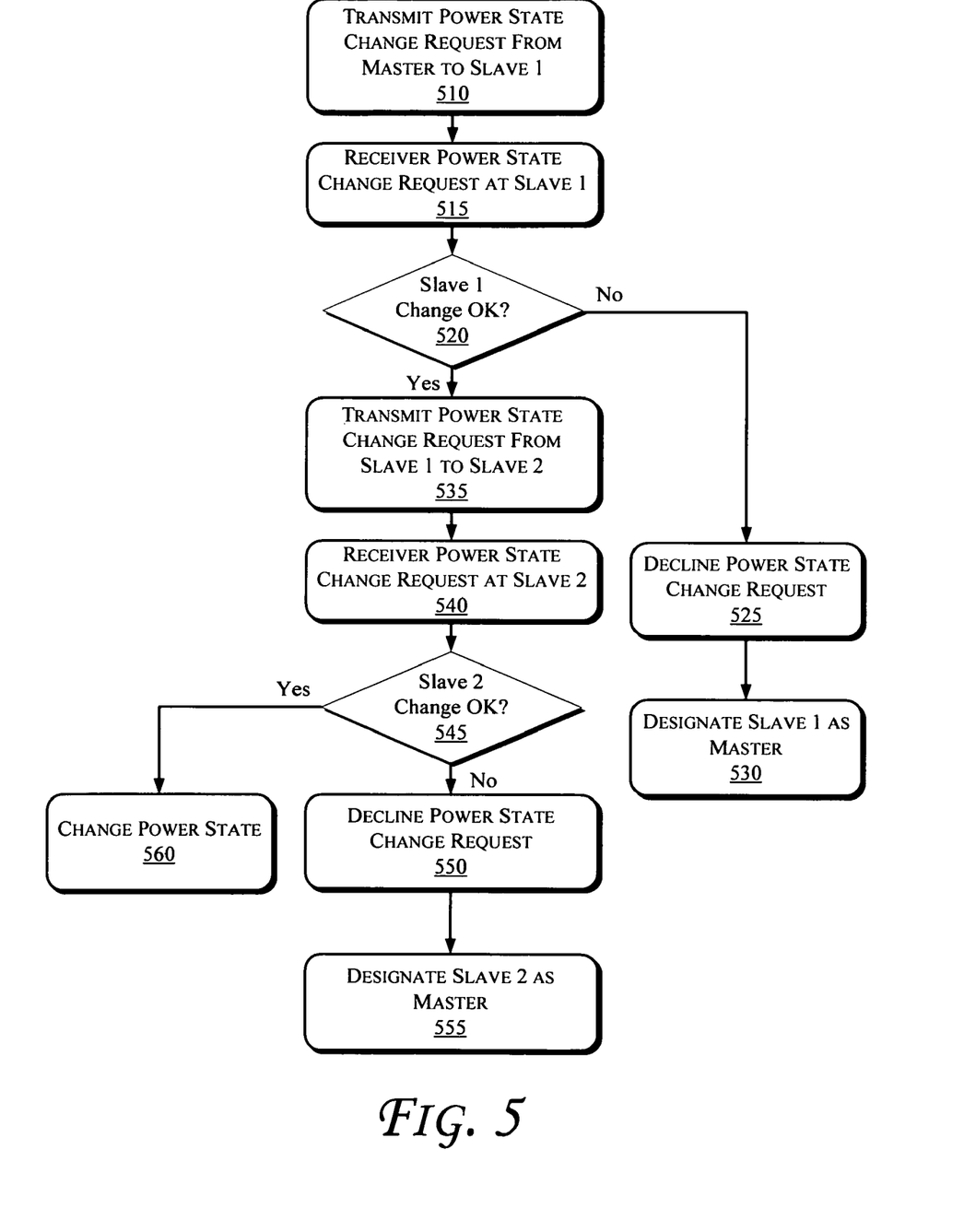
FIG. 5 illustrates a flow diagram a method to manage communication bus power states, according to an embodiment.

FIG. 5 is a flow diagram of a method to manage communication bus power states in a three-node communication bus, according to an embodiment. The operations illustrated in FIG. 5 may be implemented as logic instructions recorded in a machine-readable memory, e.g., as software executable on a processor such as processor 112 or as firmware executable by a controller such as, e.g., an I/O port controller. Alternatively, the operations of FIG. 5 may be reduced to logic in a configurable logic device such as, e.g., a Field Programmable Gate Array (FPGA), or hard-wired in a logic device such as, e.g., an application specific integrated circuit (ASIC) or as a component of an I/O controller on an integrated circuit.

At operation 510 a power state change request is transmitted from a master node. In one embodiment, the initial designation of a node as the master node may be made arbitrarily. For purposes of explanation, it will be assumed that node 1 (410) is designated as the master node, and nodes 2 and 3 (412, 414) are designated as slave nodes by default. In one embodiment, the master node 410 sends a power state change request to a first slave node, which may be selected arbitrarily. For purposes of illustration, this description assumes that master node 410 transmits power state change request to first slave node 412. At operation 515 the power state change request is received in the first slave node 412.

If, at operation 520, conditions do not permit the first slave node to approve the power state change request, then control passes to operation 525 and the first slave node declines the power state change request. At operation 530 the first slave node 412 is designated as the master node.

By contrast, if at operation 520 conditions permit the first slave node 412 to approve the power state change request, then control passes to operation 535 and the first slave node 412 transmits a power state change request to the second slave node 414. At operation 540 the power state change request is received in the second slave node 414.

If, at operation 545, conditions at the second slave node 414 do not enable the slave node 414 to approve the power state change request, then control passes to operation 550 and the second slave node 414 declines the power state change request. In one embodiment, the second slave node 414 transmits an acknowledgment response to the slave node 412 declining the power state change request. Control then passes to operation 555 and the second slave node 414 assumes the role of the master node, and the master node assumes the role of a slave node.

By contrast, if at operation 545 the second slave node 414 approves the power state change request, then control passes to operation 560 and the power state of the communication bus is changed, e.g., from a high power consumption state to a low power consumption state. In some embodiments, slave nodes 412, 414 may require one or more conditions to be satisfied before approving a power state change request. For example, a slave node may require that no further I/O operations are pending at the slave node. If the slave node 412 approves the power state change request, then the slave node 412 transmits an acknowledgment response to the master node.

Thus, the operations of FIGS. 3 and 5 manage power changes in a communication bus by permitting master nodes to initiate a power state change request. Slave nodes may transmit power state change requests in response to receiving a power state change request form a master node. In some embodiments, a node that has transmitted a power state change request halts transmission on the node until a response to the power state change is received. In the event a cyclic redundancy check (CRC) error occurs, the node may execute a link-level retry to attempt to get a valid response.

Figure 6:
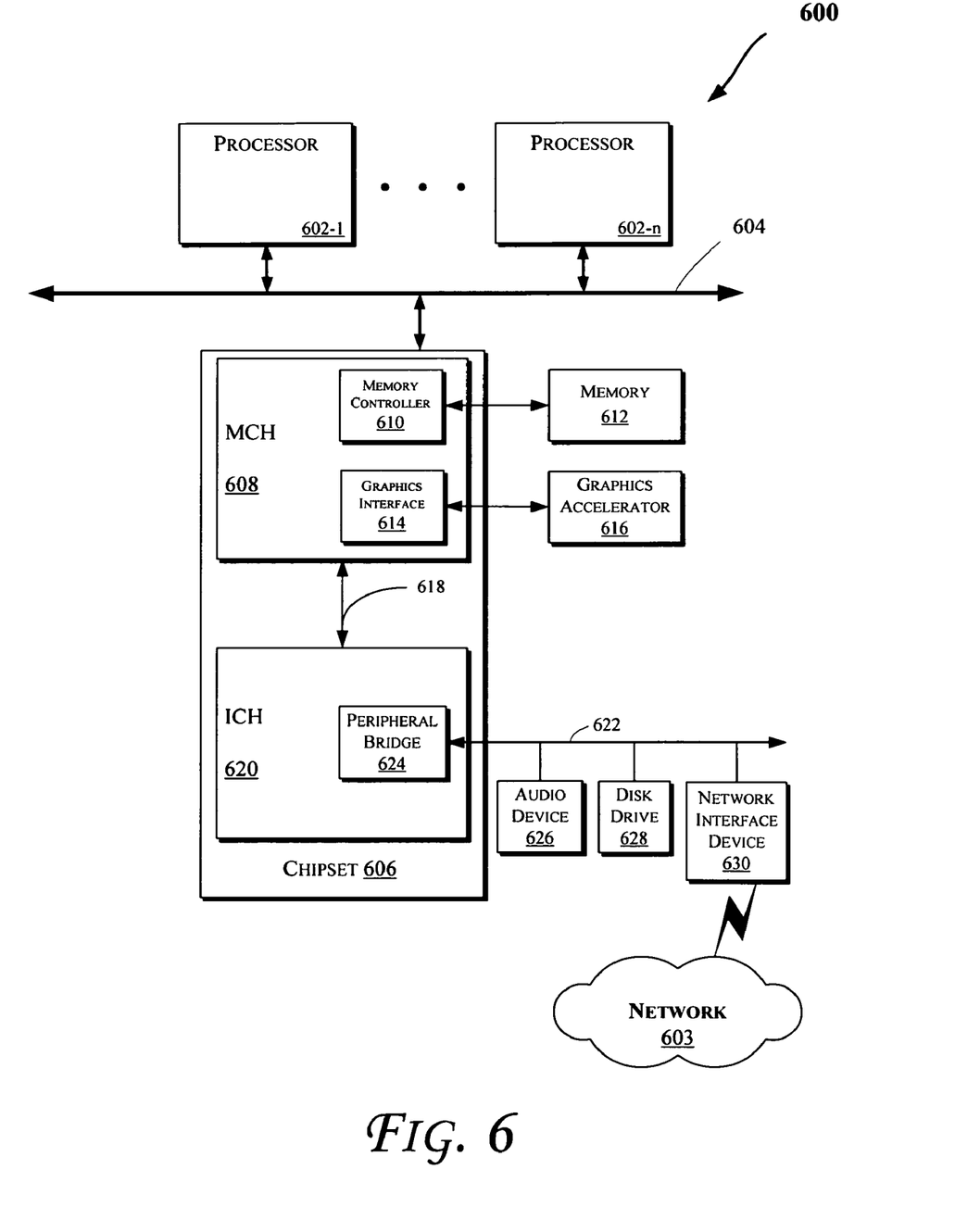
FIGS. 6 and 7 illustrate block diagrams of embodiments of computing systems, which may be utilized to implement various embodiments discussed herein.

In some embodiments, the system of FIG. 1 may be implemented within a computing system. FIG. 6 illustrates a block diagram of a computing system 600 in accordance with an embodiment of the invention. Operations discussed with reference to FIGS. 3 and 5 may be performed by one or more components of the system 600.

The computing system 600 may include one or more central processing unit(s) (CPUs) 602 or processors in communication with an interconnection network (or bus) 604. The processors 602 may be any processor such as a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors.

A chipset 606 may also be in communication with the interconnection network 604. The chipset 606 may include a memory control hub (MCH) 608. The MCH 608 may include a memory controller 610 that communicates with a memory 612. The memory 612 may store data and sequences of instructions that are executed by the CPU 602, or any other device included in the computing system 600. In one embodiment of the invention, the memory 612 may include one or more volatile storage (or memory) devices such as random access memory (RAM), dynamic RAM (DRAM), synchronous DRAM (SDRAM), static RAM (SRAM), or other types of memory. Nonvolatile memory may also be utilized such as a hard disk. Additional devices may communicate through the interconnection network 604, such as multiple CPUs and/or multiple system memories.

The MCH 608 may also include a graphics interface 614 that communicates with a graphics accelerator 616. In one embodiment of the invention, the graphics interface 614 may be in communication with the graphics accelerator 616 via an accelerated graphics port (AGP). In an embodiment of the invention, a display (such as a flat panel display) may communicate with the graphics interface 614 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display.

A hub interface 618 may allow the MCH 608 to communicate with an input/output control hub (ICH) 620. The ICH 620 may provide an interface to I/O devices that communicate with the computing system 600. The ICH 620 may communicate with a bus 622 through a peripheral bridge (or controller) 624, such as a peripheral component interconnect (PCI) bridge, a universal serial bus (USB) controller, or other types of a bus. The bridge 624 may provide a data path between the CPU 602 and peripheral devices. Other types of topologies may be utilized. Also, multiple buses may communicate with the ICH 620, e.g., through multiple bridges or controllers. Moreover, other peripherals in communication with the ICH 620 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other types of peripherals.

The bus 622 may communicate with an audio device 626, one or more disk drive(s) 628, and a network interface device 630 (which may be in communication with the computer network 603). Other devices may communicate through the bus 622. Also, various components (such as the network interface device 630) may be in communication with the MCH 608 in some embodiments of the invention. In addition, the processor 602 and the MCH 608 may be combined to form a single chip. Furthermore, the graphics accelerator 616 may be included within the MCH 608 in other embodiments of the invention.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media capable of storing electronic instructions and/or data.

Figure 7:
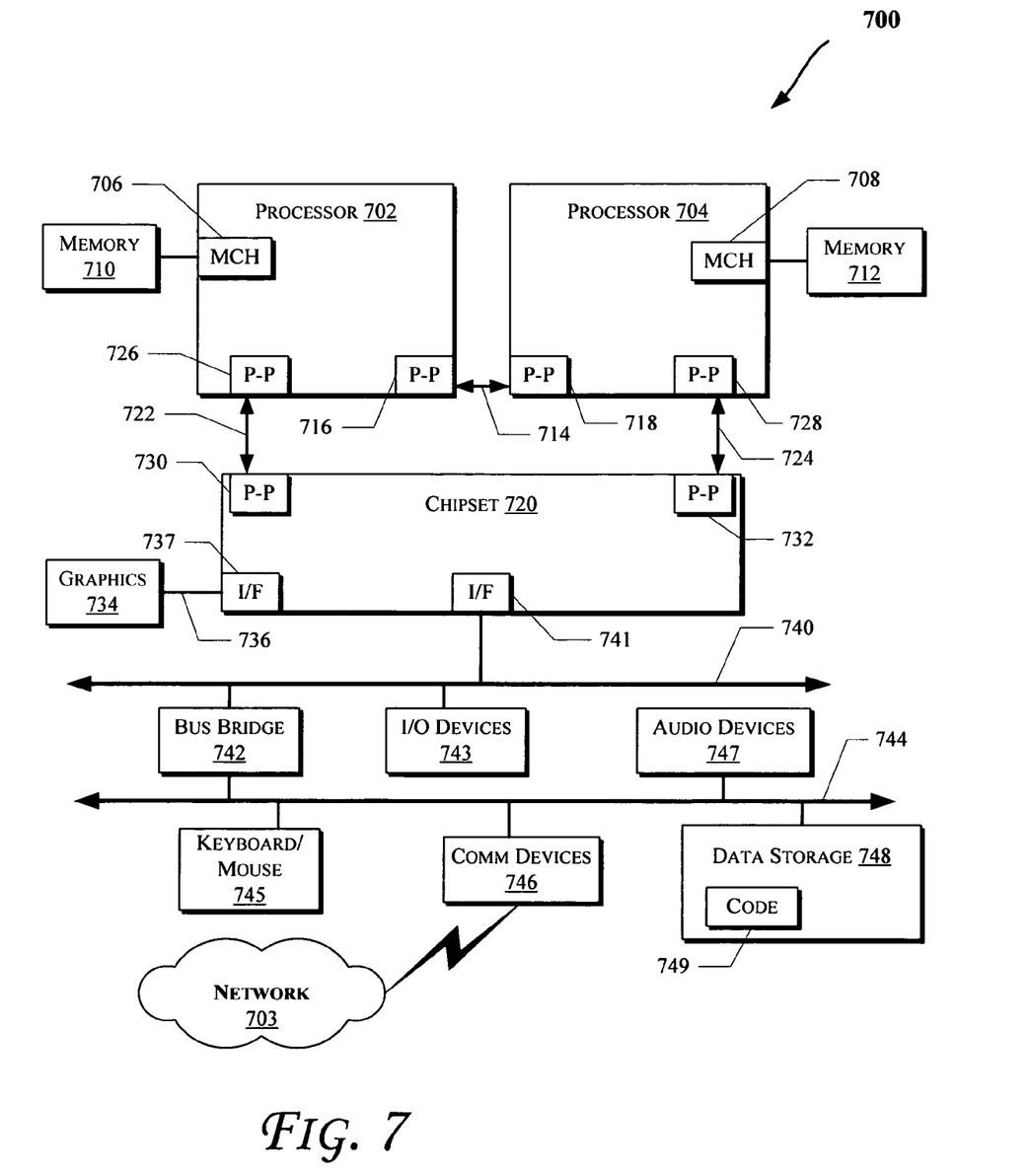

FIG. 7 illustrates a computing system 700 that is arranged in a point-to-point (PtP) configuration, according to an embodiment of the invention. In particular, FIG. 7 shows a system where processors, memory, and input/output devices are interconnected by a number of point-to-point interfaces. Operations discussed with reference to FIGS. 3 and 5 may be performed by one or more components of the system 700.

As illustrated in FIG. 7, the system 700 may include several processors, of which only two, processors 702 and 704 are shown for clarity. The processors 702 and 704 may each include a local memory controller hub (MCH) 706 and 708 to communicate with memories 710 and 712. The memories 710 and/or 712 may store various data such as those discussed with reference to the memory 612.

The processors 702 and 704 may be any type of a processor such as those discussed with reference to the processors 602 of FIG. 6. The processors 702 and 704 may exchange data via a point-to-point (PtP) interface 714 using PtP interface circuits 716 and 718, respectively. The processors 702 and 704 may each exchange data with a chipset 720 via individual PtP interfaces 722 and 724 using point to point interface circuits 726, 728, 730, and 732. The chipset 720 may also exchange data with a high-performance graphics circuit 734 via a high-performance graphics interface 736, using a PtP interface circuit 737.

At least one embodiment of the invention may be provided within the processors 702 and 704. Other embodiments of the invention, however, may exist in other circuits, logic units, or devices within the system 700 of FIG. 7. Furthermore, other embodiments of the invention may be distributed throughout several circuits, logic units, or devices illustrated in FIG. 7.

The chipset 720 may be in communication with a bus 740 using a PtP interface circuit 741. The bus 740 may have one or more devices that communicate with it, such as a bus bridge 742 and I/O devices 743. Via a bus 744, the bus bridge 743 may be in communication with other devices such as a keyboard/mouse 745, communication devices 746 (such as modems, network interface devices, or other types of communication devices that may be communicate through the computer network 703), audio I/O device, and/or a data storage device 748. The data storage device 748 may store code 749 that may be executed by the processors 702 and/or 704.

In various embodiments of the invention, the operations discussed herein, e.g., with reference to FIGS. 3 and 5, may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include any type of a storage device such as those discussed with respect to FIGS. 6 and 7.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although some embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A computer based method to manage a power state of a communication bus in an electronic device, comprising:
    transmitting a first power state change request from a master node on the communication bus to a first slave node on the communication bus;
    receiving the first power state change request in the first slave node;
    determining whether the first slave node can accept the power change request; and
    changing the status of the first slave node to a master node when the first slave node cannot accept the first power state change request.

2. The method of claim 1, wherein the first power state change request comprises a request to change to a low power consumption state.

3. The method of claim 1, further comprising determining, at the first slave node, whether one or more additional input/output transactions are pending at the first slave node.

4. The method of claim 1, further comprising:
    generating, at the first slave node, a second power state change request; and
    transmitting the second power state change request to a second slave node.

5. The method of claim 4, further comprising:
    receiving the second power state change request in the second slave node; and
    designating the second slave node as the master node when the second slave node denies the second power state change request.

6. An electronic apparatus comprising:
    a bus including a master node and at least a first slave node;
    a processor;
    a memory module comprising logic instructions stored on a computer readable medium which, when executed on the processor, configure the processor to:
        transmit a first power state change request from the master node to the first slave node;
        receive the first power state change request in the first slave node;
        determine whether the first slave node can accept the power change request; and
        change the status of the first slave node to a master node when the first slave node cannot accept the first power state change request.

7. The electronic apparatus of claim 6, wherein the first power state change request comprises a request to change to a low power consumption state.

8. The electronic apparatus of claim 6, further comprising logic instructions stored on a computer readable medium which, when executed on the processor, configure the processor to determine, at the first slave node, whether one or more additional input/output transactions are pending at the first slave node.

9. The electronic apparatus of claim 6, further comprising logic instructions stored on a computer readable medium which, when executed on the processor, configure the processor to:
    generate, at the first slave node, a second power state change request; and
    transmit the second power state change request to a second slave node.

10. The apparatus of claim 9, further comprising logic instructions stored on a computer readable medium which, when executed on the processor, configure the processor to:
    receive the second power state change request in the second slave node; and
    designate the second slave node as the master node when the second slave node denies the second power state change request.

11. A system comprising:
    a memory module;
    a first integrated circuit device;
    a second integrated circuit device;
    a bus to provide communication between the first integrated circuit device and the second integrated circuit device, the bus including a master node and at least a first slave node;
    a memory module comprising logic instructions stored on a computer readable medium which, when executed on a processor, configure the processor to:
        transmit a first power state change request from the master node to the first slave node;
        receive the first power state change request in the first slave node;
        determine whether the first slave node can accept the power change request; and
        change the status of the first slave node to a master node when the first slave node cannot accept the first power state change request.

12. The system of claim 11, wherein the first power state change request comprises a request to change to a low power consumption state.

13. The system of claim 11, further comprising logic instructions stored on a computer readable medium which, when executed on the processor, configure the processor to determine, at the first slave node, whether one or more additional input/output transactions are pending at the first slave node.

14. The system of claim 11, further comprising logic instructions stored on a computer readable medium which, when executed on the processor, configure the processor to:
    generate, at the first slave node, a second power state change request; and
    transmit the second power state change request to a second slave node.

15. The system of claim 14, further comprising logic instructions stored on a computer readable medium which, when executed on the processor, configure the processor to:
    receive the second power state change request in the second slave node; and
    designate the second slave node as the master node when the second slave node denies the second power state change request.

16. A computer based method to manage a power state of a communication bus in an electronic device, comprising:
    designating a first node as a master node on a point-to-point bus;
    originating a first power state change request from the master node; and
    reassigning the master node to a second node on the point-to-point bus when the first power state change request is denied.

17. The method of claim 16, further comprising:
    transmitting the first power state change request from the master node to a first slave node; and
    designating the first slave node as the master node when the first slave node denies the first power change state request.

18. The method of claim 17, further comprising:

originating a second power state change request from the first slave node; and reassigning the master node when the second power state change request is denied.

19. A bus controller, comprising:

a memory module comprising logic instructions stored on a non-transitory computer readable storage medium which, when executed on a processor, configure the controller to:

designate a master node on a point-to-point bus;

originate a first power state change request from the master node; and reassign the master node when the first power state change request is denied.

20. The bus controller of claim 19, further comprising logic instructions stored on a non-transitory computer readable storage medium which, when executed on a processor, configure the controller to:

transmit the first power state change request from the master node to a first slave node; and designate the first slave node as the master node when the first slave node denies the first power change state request.

21. The bus controller of claim 20, further comprising logic instructions stored on a non-transitory computer readable storage medium which, when executed on a processor, configure the controller to:

originate a second power state change request from the first slave node; and reassign the master node when the second power state change request is denied.

* * * * *

UNITED STATES PATENT AND TRADEMARK OFFICE
CERTIFICATE OF CORRECTION

| | | |
|---|---|---|
| PATENT NO. | : 7,908,497 B2 | Page 1 of 1 |
| APPLICATION NO. | : 12/378210 | |
| DATED | : March 15, 2011 | |
| INVENTOR(S) | : Shaun Conrad et al. | |

It is certified that error appears in the above-identified patent and that said Letters Patent is hereby corrected as shown below:

On the Face Page, in field (75), in Inventors, in column 1, line 2, delete "Safranck," and insert -- Safranek, --, therefor.

On the Face Page, in field (56), under (Other Publications), in column 2, line 5, delete "P11011;" and insert -- P22011; --, therefor.

Signed and Sealed this
Thirteenth Day of September, 2011

David J. Kappos
*Director of the United States Patent and Trademark Office*